United States Patent Office 3,223,734
Patented Dec. 14, 1965

3,223,734
PROCESS FOR PRODUCING TERTIARY AMINES
Harlan T. Fallstad, Hopkins, Minn., and Alfred E. Rheineck, Fargo, N. Dak., assignors to Archer-Daniels-Midland Company, Minneapolis, Minn., a corporation of Delaware
No Drawing. Filed Apr. 26, 1961, Ser. No. 115,065
18 Claims. (Cl. 260—583)

This application is a continuation-in-part of our applications Serial No. 664,467 and Serial No. 664,468, each being abandoned (both applications were filed on June 10, 1957), and the invention relates to improved processes for the preparation of tertiary amines.

More particularly the improvement or discovery relates to liquid batch processing for the production of tertiary amines having at least one fatty chain derived from fatty acid material of 8 through 22 carbon atoms by reacting primary and/or secondary amines particularly amines derived from long chain fatty acids, with alcohols in the presence of a hydrogenation-dehydrogenation catalyst with continuous removal of the water of reaction at moderate temperatures.

In our above mentioned applications, included and illustrated herein, the tertiary amines were formed primarily of mixtures of primary and/or secondary amines, with the same or unlike alkyl groups, reacted with essentially pure or mixed alcohols to yield tertiary amines with mixed or similar alkyl groups; with the sum of the carbon atoms in the two shortest chains being at least 5. It has now been discovered that our simplified liquid batch catalytic process may be utilized in effecting a lower total sum of carbon atoms in the two shortest chains and also provide tertiary amines from saturated and unsaturated, substituted and unsubstituted straight or branch chain aliphatic and aromatic alcohols and primary and/or secondary amines having similar and/or different aliphatic and aromatic carbon chains. It has been found that branched chain alkyl reactants with branching at the carbon atom alpha to the amino group and alpha and/or beta to the hydroxyl group are less preferred as such reactants appear to obtain yields in the lower limits of the most desired results. By liquid batch or liquid phase process it is meant that the bulk of the reaction mass and resultant tertiary amines appear to remain in liquid phase as the tertiary amines are formed, as distinguished from a vapor phase reaction of all the reactants.

Generally, the present methods in the art for producing tertiary amines are unsatisfactory and undesirable due to either poor yields, undesired side reactions, difficult methods of preparations, special equipment requirements, and the use of expensive or not readily available raw materials. The following methods are most universal.

(1) Reaction of primary or secondary amines with alkyl halides:

$$RNH_2 + 2R'X \rightarrow RNR'_2 + 2HX$$

or $$R_2NH + R'X \rightarrow R_2NR' + HX$$

R and R′ are alkyl and X is halogen.

Disadvantages:

(a) The halides are relative expensive and not readily available, especially in the longer chain lengths.
(b) Quaternary ammonium compounds may be produced. These must either be removed or reconverted to the tertiary amines.
(c) The halogen acids produced by reaction must be neutralized and removed.

(2) Reaction of aldehydes or ketones with amines in the presence of hydrogen and a catalyst:

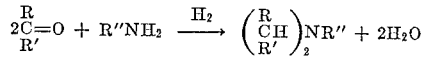

where R and R″ are alkyl and R′ is alkyl or hydrogen.

Disadvantages:

(a) Hydrogen gas and pressure equipment must be used.
(b) Long chain aldehydes are not readily available and are unstable.

(3) Reaction of primary or secondary amines with alcohols using a catalyst:

$$2ROH + R'NH_2 \xrightarrow{Cat.} R_2NR' + 2H_2O$$

$$ROH + R'NH_2 \xrightarrow{Cat.} RNR'_2 + H_2O$$

where R and R′ are alkyl.

Disadvantages:

(a) Where catalyst is of the dehydration type. High temperature, continuous, vapor-phase processes are generally required to obtain satisfactory products. This requires special equipment and operating conditions. Also, a substantial excess of the amine or alcohol is usually required to achieve satisfactory results. U.S. Patents 2,043,965 issued to Smeykal and U.S. 2,073,671 to Andrews are examples of this method of preparation.
(b) Where catalyst is of the hydrogenation-dehydrogenation type. The prior art shows that this is usually a vapor phase reaction (one or both reactants in the vapor phase) which has the same disadvantages as cited in (a) above. In most cases, hydrogen is also required. At best, yields are not as good as desired, since the products are mixtures of primary, secondary and tertiary amines. U.S. Patent 2,160,058 issued to Covert describes a high temperature, high pressure process requiring hydrogen. Under such conditions water remains in the system during the patentee's necessary different reaction condition. U.S. Patent 2,365,721 to Olin et al., describes a somewhat similar process which is a continuous, vapor-phase operation. His Example V shows that hydrogen is required for satisfactory results. The product obtained is a mixture of primary, secondary and tertiary amines. U.S. Patent 2,782,237 to Hindley et al. describes a batch process for making primary amines from alcohols and ammonia in the presence of a hydrogenation-dehydrogenation catalyst. Hindley's process is specifically directed towards preparation of primary amines. He states that formation of tertiary amines is generally negligible. In fact, small amounts of secondary amine in the original charge actually inhibit formation of additional secondary amine.

(4) Reaction of ammonia with alcohols as represented in Whitaker Patent No. 2,953,601:

$$NH_3 + ROH \rightarrow RNH_2 + H_2O$$

R is an alkyl of at least 5 carbon atoms or about 8 to about 13 carbon atoms.

Disadvantages:

(a) Confined to alcohols without control of distribution of alkyl groups in the reaction products.
(b) Necessitates using ammonia which is a difficult gas to handle necessitating special apparatus and must by nature of process be used in considerable excesses.
(c) Limited control over reaction product quality and extent of conversion to tertiary amines. That is, incomplete conversion of non-tertiary primary and secondary amines.

We have discovered that the inherent aforementioned disadvantages of the processes described in the prior art are simplified and overcome by our process.

Accordingly, it is an object of this invention to provide an improved batch reaction process for producing high yields of tertiary amines by adding and reacting alcohols with primary and/or secondary amines and preferably long chain fatty amines at moderate temperatures in the presence of a catalyst with continuous removal of water of reaction.

It is another object of this invention to provide an improved process for the controlled production of tertiary amines having selected distribution of alkyl groups in the molecules, such products being derived from primary and secondary amines by the addition of selected alcohols and removal of the water of reaction without the need for especially designed equipment. Most simply, a reactor or kettle equipped with suitable heating means, suitable means for agitation, and suitable means for removing water as the reaction proceeds is all the equipment needed.

An additional object of this invention is to provide the art with a simplified commercial batch process for producing high yields on the order of up to substantially 100% of symmetrical mono- or poly-tertiary amino compounds, unsymmetrical mono- or poly-tertiary amino compounds and mixtures of the same from reacting saturated and unsaturated alcohols with saturated and unsaturated primary and secondary amines, and mixtures of each of the same under resultant product controlled conditions and in the presence of hydrogenation-dehydrogenation catalyst with simultaneous and continuous removal of water of reaction from the batch process while effecting reaction under conditions from substantially atmospheric to reduced pressures.

To the accomplishment of the foregoing and related ends, this invention then comprises the features of improvement hereinafter more fully described and exemplified. The following description sets forth in more detail certain illustrative embodiments of the invention, these being indicative of the various ways in which the inventive concept may be employed.

In the process of this invention the reactants and catalysts are placed in a reactor. The reaction is conducted at temperatures varying from 90° C. to 230° C., dependent upon the particular alcohol and amine components, with continuous removal of water from the liquid batch in the reactor until high yields of tertiary amines are obtained. As indicated, by liquid batch or liquid phase process we mean that the bulk of the batch reaction mass is retained in liquid form and the reaction appears to take place in the liquid mass irrespective of whether the amine is immediately or gradually mixed with the alcohol or the alcohol is added in whole or portionwise to the amine.

In the formation of tertiary amines, several intermediate reactions occur. For the purposes of this disclosure, the net result is shown in the subsequent summarizing equations.

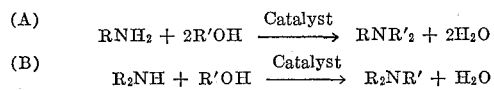

(A) $$RNH_2 + 2R'OH \xrightarrow{Catalyst} RNR'_2 + 2H_2O$$

(B) $$R_2NH + R'OH \xrightarrow{Catalyst} R_2NR' + H_2O$$

where R+R' are substituted or unsubstituted, straight or branched alkyl chains of 1–22 carbon atoms.

The catalysts which are used in the process of this invention are those commonly known in the art as the hydrogenation-dehydrogenation type. These comprise a family of active forms of nickel, e.g. Raney nickel, palladium, platinum, copper, cobalt, copper chromium oxide complexes and the like. These catalysts may also be on a suitable carrier. These catalysts may be used in concentrations varying from about 0.1% to about 10%. The preferred range is from about 1% to about 5%.

The efficiency of the catalyst diminishes somewhat on reuse. This can be compensated for by the addition of small portions of fresh catalyst, or by reactivation.

The method for removal of water of reaction may be by any one or a combination of those techniques considered functionally equivalent, e.g. azeotropic, gas sparge or vacuum techniques.

The azeotropic technique comprises adding an azeotropic agent which forms an azeotrope with water. The azeotrope vapors are distilled out of the reactor, condensed, water is separated off and the azeotropic agent may be returned to the kettle. The azeotropic agent may be an inert agent such as the hydrocarbons benzene, toluene, xylene, hexane, octane, mineral spirits, varnish-makers' and painters' naphtha, and the like. Any agent which does not interfere with the reaction and which effectively removes water of reaction, may be used. Excess of one of the reactants may also be used as the azeotropic agent, e.g. butyl alcohol or butyl amine. Economics of the process and various inert or reactive agents are the prime criteria in selecting an agent. A combination of inert agents and/or the reactants may also be used for the azeotropic agent. Depending on the reactants, somewhat elevated or reduced pressures may also be used to facilitate control of the reaction and water removal. If one of the reactants is quite volatile, then elevated pressure may be desirable to keep it in the liquid stage in the process, while water is continuously removed. Conversely, if the reactants are high boiling, reduced pressures may be used to speed up the rate of water removal.

The gas sparge technique consists of passing a gas through or over the surface of the liquid mixture. This serves as a carrier to remove water of reaction. The gas may be an inert gas such as nitrogen, methane, propane, etc. Hydrogen gas may also be used to effect continuous removal of water from the liquid mixture. Although hydrogen might be considered as a reactive gas since a dehydrogenation-hydrogenation mechanism is involved, its purpose in this invention, for improving production and yield of tertiary amines, is primarily to effect continuous removal of water of reaction. In some cases, slightly better results are obtained through the use of hydrogen as compared to nitrogen, especially in product color improvement, but nitrogen is still a satisfactory gas. Contrary to the high pressure and high temperature systems of the prior art which claims that hydrogen must be present in such systems, in this invention, hydrogen may or may not be used as the gas sparge agent for effecting continuous water removal. Depending on the volatility of the reactants, somewhat elevated or reduced pressures may be used. In some cases an excess reactant, e.g. methyl amine, may be used as the gas sparge, but this is generally not preferred due to the added cost.

The vacuum technique consists of running the reaction under reduced pressures to facilitate removal of water of reaction. With certain higher boiling reactants, a high enough reaction temperature may be maintained so that the water will boil out of the mixture at atmospheric or only slightly reduced pressures at a rate fast enough to drive the reaction to completion.

Generally one of the above techniques or a combination of any of them is preferred, depending on the reactants involved. For example, if one of the reactants is quite volatile, then the azeotropic process may be preferred to the vacuum process. Conversely, if the reactants are high boiling, then the gas sparge or vacuum technique may be preferred.

The reactant amine may be any of the group of primary or secondary mono- or poly-amines or combinations of these. The prime requisite is that the amino-compound have at least one hydrogen atom attached to its nitrogen atom, and that no other reactive groups, except hydroxyl, are present in the molecule. Some typical and common, but not limiting, amines which are useful in this process are: methyl amine, butyl amine, octyl amine, dodecyl amine, octadecyl amine, behenyl amine, iso[1]-octyl amine, iso-decyl amine, dimethyl amine, di-n-propylamine, di-n-decyl amine, di-behenyl amine, di-iso-octyl amine, di-iso-tridecyl amine, di-3,3,5-trimethylnonyl amine, N-ethyl-N-butyl amine, N-methyl-N-lauryl amine, primary or secondary amines derived from coconut oil or hydrogenated tallow, or hydrogenated soybean oil, ethylene diamine, triethylene tetramine, N-dodecyl propylene diamine, N-hydrogenated tallow propylene diamine, dodecyloxy propylamine, di(dodecyloxy propyl)amine, oleyl amine, benzyl amine, and the like. These typical amines can be characterized as saturated and ethylenically unsaturated, substituted and unsubstituted, straight and branched chain, aliphatic amines.

The reactant alcohol may be any of the group of primary mono- or poly-alcohols or combinations of these. The prime requisite is that the hydroxy compound have at least one primary hydroxy group and that no other reactive groups, except amino, are present in the molecule. Some typical and common, but not limiting, alcohols which are useful in this process are: methanol, butanol, dodecanol, octadecanol, behenyl alcohol, alcohols derived from hydrogenated tallow or coconut oil or hydrogenated soybean oil, isooctyl alcohol, isotridecyl alcohol, ethylene glycol, propylene glycol, glycerine, benzyl alcohol including those derived from animal, vegetable, mineral and marine oil sources, 1,4-butane diol, pentaerythritol, oleyl alcohol, and the like. These typical alcohols can be characterized as saturated and ethylenically unsaturated, substituted and unsubstituted, straight and branched chain, aliphatic alcohols. One preferred class of alcohols consists of the saturated aliphatic alcohols containing from 4 through 22 carbon atoms, e.g., $C_4$–$C_{22}$ alkyl alcohol.

Amino-alcohols or hydroxy-amines may also be used in this process, e.g. ethanol amine, propanol amine, diethanol amine, triethanol amine, and the like. Amino-hydroxy compounds of this type may be condensed with themselves or may be reacted with hydroxy or amino compounds.

Generally, a slight molar excess of alcohol is desired to obtain maximum yields of tertiary amines, but this is somewhat regulated by the volatility of the reactants or their ease of removal from the reaction mixture. In other words, an excess of diethyl amine might be preferred in the reaction between diethyl amine and octadecanol, since the diethyl amine may be easily removed by distillation. Excess of one of the reactants is also governed by the economics involved.

The reaction temperature may be in the range of from about 90° C. to not over about 230° C. The method of water removal and the volatility of the reactants generally dictate what temperature is desirable. The preferred temperature is from about 120° C. to about 170° C. As indicated, this preferred process produces yields of tertiary amines on the order of from about 65% to about 100%. Symmetrical and/or unsymmetrical mono- and/or poly-tertiary amines can be prepared and can be more feasibly obtained in improved yields by the methods described.

The following representative and illustrative examples will show the versatility and excellent results obtained with this process.

EXAMPLE I

Preparation of tridodecyl amine

| | Parts |
|---|---|
| Dodecyl amine | 37 |
| Dodecyl alcohol | 116 |
| Raney nickel | 11.8 |
| Toluene | 17 |

The Raney nickel catalyst is prepared as follows: 20.6 parts Raney nickel catalyst slurry, 11.74 parts actual nickel, is washed by stirring, allowing to settle and decanting off the liquid. The washing is accomplished once with distilled water, three times with absolute methanol to remove the water, and once with toluene (the azeotropic agent) to remove the methanol.

The above were charged into the reactor and heated to reflux temperature of the water-toluene azeotrope and heating is continued until no more water was liberated. Initial reaction temperature was 126° C. and final temperature was 181° C. Reaction time was 2⅙ hours. After cooling, the mixture was filtered with "Hyflo"[2] filter aid to remove catalyst. Toluene and excess alcohol were removed by distillation under reduced pressure. The product, tri-dodecyl amine, analyzed at 94.5% tertiary amine.

EXAMPLE II

Preparation of tridodecylamine

| | Parts |
|---|---|
| Didodecyl amine | 70.6 |
| Dodecyl alcohol | 55.8 |
| Raney nickel | 20.6 |
| Toluene | 17.0 |

This example was run in a manner similar to Example I. Reaction temperatures were in the 165° to 170° C. range and reaction time was 4 hours.

The product, tri-dodecyl amine, analyzed at 93% tertiary amine.

EXAMPLE III

Preparation of didodecyl-n-hexyl amine using hexyl alcohol as a reactant and as the reaction's azeotropic agent.

| | Parts |
|---|---|
| Didodecyl amine | 105.9 |
| n-Hexyl alcohol | 40.8 |
| Raney nickel | 8.8 |

This example was run in a manner similar to Example I, except that the n-hexyl alcohol was used as a reactant and as the reaction's azeotropic agent. Reaction temperatures were in the 128° to 175° C. range and reaction time was 2½ hours.

The product, didodecyl-n-hexyl amine analyzed at 98.2% tertiary amine.

EXAMPLE IV

Preparation of N-ethyl-N-butyl isodecyl amine

| | Parts |
|---|---|
| N-ethyl butyl amine | 40.4 |
| Isodecyl alcohol | 94.8 |
| Raney nickel | 11.8 |
| Benzene | 17.5 |

This example was run in a manner similar to Example I. Reaction temperatures were in the 94°–111° C. range and reaction time was 4½ hours. The product, N-ethyl-N-butyl isodecyl amine analyzed at 90.8% tertiary amine.

EXAMPLE V

Preparation of tri-dodecyl amine with copper chromite catalyst

| | Parts |
|---|---|
| Dodecyl amine | 27.75 |
| Dodecyl alcohol | 83.70 |
| Copper chromite catalyst [1] | 10.40 |
| Xylene | 12.5 |

[1] A commercially available hydrogenation-dehydrogenation catalyst containing 40% CuO, 46% $Cr_2O_3$, and 10% BaO.

This example was run in a manner similar to Example I. No catalyst preparation was required.

Reaction temperatures were in the 186°–188° C. range and reaction time was 2 hours.

---

[1] "Iso" designates compounds with variable numbers of side groups at different positions on a straight chain.

[2] The Hyflo filter aid is a commercially produced filter aid made of diatomaceous earth.

The product, tri-dodecyl amine, analyzed at 63.2% tertiary amine.

EXAMPLE VI

*Preparation of tri-dodecyl amine with palladium on catalyst carrier*

| | Parts |
|---|---|
| Dodecyl amine | 37.0 |
| Dodecyl alcohol | 111.6 |
| 5% palladium on carbon powder | 20.85 |
| Xylene | 7.5 |

This example was run in a manner similar to Example I. No catalyst preparation was required.

Reaction temperatures were in the 155°–205° range and reaction time was 5½ hours.

The product, tri-dodecyl amine, analyzed at 86.6% tertiary amine.

EXAMPLE VII

For comparative purposes, this example illustrates the attempted preparation of tri-dodecyl amine with a dehydration catalyst.

| | Parts |
|---|---|
| Diodecyl amine | 70.6 |
| Dodecyl alcohol | 37.2 |
| Alumina [4] (activated) | 26.1 |
| Benzene | 17.5 |

[4] 80–200 mesh.

This example was run in a manner similar to Example I. Reaction temperatures were in the range of 143° C. to 160° C. with a reaction time of 8½ hours. The product analyzed only 15.6% tertiary amine and it is shown that under the physical conditions of the present process a dehydration catalyst does not produce a satisfactory yield.

EXAMPLE VIII

*Preparation of N,N-di(dodecyloxy propyl)lauryl amine*

| | Parts |
|---|---|
| Di(dodecyloxy propyl amine) | 70.35 |
| Dodecyl alcohol | 55.8 |
| Raney nickel | 4.42 |
| Xylene | 15.0 |

This example was run in a manner similar to Example I. Reaction temperatures were in the range of 170°–190° C. and reaction time was 3½ hours. The product, N,N-di(dodecyloxy propyl)lauryl amine, analyzed at 97.3% tertiary amine.

EXAMPLE IX

*Reaction of 1,4-butanediol and di(dodecycloxy propyl)amine*

| | Parts |
|---|---|
| Di(dodecyloxy propyl)amine | 93.8 |
| 1,4-butanediol | 9.0 |
| Raney nickel | 11.74 |
| Xylene | 10 |

This example was run in a manner similar to Example I. Reaction temperatures were in the range of 135°–165° C. and reaction time was 5 hours. The product analyzed 85.8% tertiary amine.

EXAMPLE X

*Reaction product of pentaerythritol and triethylene tetramine*

| | Parts |
|---|---|
| Pentaerythritol | 40.8 |
| Triethylene tetramine | 87.6 |
| Raney nickel | 17.61 |
| Xylene | 10 |

This example was run in a manner similar to Example I. Reaction temperatures were in the range of 127°–195° C. The product was dark sticky mass. It was soluble in water. Theoretical water of reaction was 21.6 parts whereas 18.0 parts were collected.

EXAMPLE XI

*Preparation of tri-benzyl amine*

| | Parts |
|---|---|
| Benzyl amine | 53.5 |
| Benzyl alcohol | 108.0 |
| Raney nickel | 8.1 |
| Toluene | 15.0 |

This example was run in a manner similar to Example I. Reaction temperatures were in the range 149°–163° C. and reaction time was 4⅙ hours. The product, tri-benzyl amine, analyzed at 77.1% tertiary amine.

EXAMPLE XII

*Preparation of dilauryl oleyl amine*

| | Parts |
|---|---|
| Dilauryl amine | 131.0 |
| Oleyl alcohol | 109.0 |
| Raney nickel | 15.0 |
| Toluene | 45.0 |

This example was run in a manner similar to Example No. I. Reaction time was 2¾ hours and reaction temperature was 167°–182° C. The product, dilauryl oleyl amine, analyzed at 69.8% tertiary amine.

EXAMPLE XIII

A 3-necked flask was equipped with thermometer, sealed stirrer, gas inlet and outlet tubes, and heating mantle. Into this flask were placed 27.75 parts dodecyl amine, 83.70 parts dodecyl alcohol, and 4.42 parts Raney nickel. Nitrogen was allowed to sweep over the surface of the mixture at a moderate rate. The mixture was heated to 127° C. and allowed to react for 5¼ hours with a maximum temperature of 175° C. After reaction, the catalyst was filtered off and the excess alcohol was distilled out of the mixture under reduced pressure. The resulting product, tri-dodecyl amine, was obtained in 81.4% yield and analyzed at 91.5% tertiary amine.

EXAMPLE XIV

The equipment used is similar to Example I, except a sintered glass gas inlet tube was inserted below the surface of the reacting materials in the flask. Into the flask were placed 38.7 parts di-n-butyl amine, 111.0 parts cetyl alcohol and 8.8 parts Raney nickel. Nitrogen was allowed to bubble through the mixture at a moderate rate. The mixture was heated to 102° C. and allowed to react for 3½ hours with a maximum temperature of 140° C. After reaction, the catalyst was filtered off and the excess alcohol was distilled out of the mixture under reduced pressure. The resulting product, di-n-butyl cetyl amine, was obtained in 80.7% yield and analyzed at 83.3% tertiary amine.

EXAMPLE XV

*Preparation of tridodecyl amine*

| | Parts |
|---|---|
| Didodecyl amine | 5100 |
| Dodecyl alcohol | 2981 |
| G–49–B catalyst [5] | 244.4 |

[5] An active nickel on kieselguhr catalyst.

This example was run in a manner similar to Example XIV, except that hydrogen gas was used as the sparging gas instead of nitrogen. Reaction temperatures were in the range of 164°–179° C. and reaction time was about 13 hours. The product, tridodecyl amine, analyzed at 96.0% tertiary amine.

EXAMPLE XVI

*Preparation of di(hydrogenated tallow)methyl amine*

| | Parts |
|---|---|
| Di(hydrogenated tallow)amine | 501 |
| Methanol | 200 |
| Raney nickel | 58.7 |

This was run in a manner similar to Example XIV, except that the methanol was added dropwise, from a separatory funnel, below the surface of the liquid and the excess methanol was allowed to vaporize and act as the sparging gas. Reaction temperature was in the range of 160°–213° C. and reaction time was 5¾ hours. The product, di(hydrogenated tallow)methyl amine, analyzed at 71.2% tertiary amine.

EXAMPLE XVII

*Preparation of dimethyl dodecyl amine*

|  | Parts |
| --- | --- |
| Dodecyl alcohol | 377 |
| Dimethyl amine | 166.5 |
| Raney nickel | 18.85 |

This was run in a manner similar to Example XVI, except the dimethyl amine was fed as a gas. Reaction time was 1⅔ hours and reaction temperature was in the range of 146°–197° C. The product, dimethyl dodecyl amine, analyzed at 69.5% tertiary amine.

EXAMPLE XVIII

*Preparation of di(hydrogenated tallow)methyl amine*

|  | Parts |
| --- | --- |
| Hydrogenated tallow alcohol | 1,054 |
| Methyl amine | Excess |
| Raney nickel | 29.35 |

This example was run in a two-step process. The first step consisted of sparging excess methyl amine through the alcohol at a temperature of 150°–200° C. for 2¼ hours in a manner similar to Example XVII to form mono(hydrogenated tallow)methyl amine. Step No. 2 consisted of stopping the methyl amine sparge and starting a nitrogen sparge to complete alkylation of the mono-(hydrogenated tallow)methyl amine to di(hydrogenated tallow)methyl amine with the unreacted alcohol that was still present. Reaction temperature for the second step was in the range 200°–230° C. and reaction time was an additional 2 hours. The product, di(hydrogenated tallow)methyl amine analyzed at 79.1% tertiary amine.

EXAMPLE XIX

*Preparation of tri(hydrogenated tallow)amine*

|  | Parts |
| --- | --- |
| Di(hydrogenated tallow)amine | 300.0 |
| Hydrogenated tallow alcohol | 170.0 |
| G–49–B catalyst | 14.1 |

This example was run by simply adding reactants and catalyst to a flask and heating at 154–195° C. for 20 hours while pulling a vacuum of 12–15 inches to remove water of reaction. The product, tri(hydrogenated tallow) amine, analyzed at 80.8% tertiary amine.

EXAMPLE XX

Charged 1800 gms. of Adol 12 lauryl alcohols and 91 gms. of supported nickel catalyst to a 4 liter resin pot equipped for agitation and gas sparging. Sparged with ammonia gas and heated the mass to 165° C. After four hours of reaction, analysis showed 31% tertiary amine, 22% secondary amine, and 17% primary amine or a total of 70% amine material. The ammonia flow was stopped and hydrogen flow started. After 1½ hours analysis showed 60.7% tertiary, 38% secondary and no primary amine or a total of 98.7% amine material. 412 gms. of alcohol was then added in several increments and sparging with hydrogen continued for 9 hours. The product after filtering contained 98% tertiary amine.

It will be recognized that the above example is an alternative process which affords an improvement upon the heretofore indicated Whitaker disclosure. By stopping the ammonia feed after production of the mono- or polyamino compound in a relative partial stage of preparation of the tertiary, adding a selected alcohol, or alcohols, in a desired amount, either initially or in subsequent step relationship, and then by finishing the process, in the manner herein provided, will obtain yields of 90% and more tertiary amines. This alternative process is particularly applicable to preparation of the preferred fatty tertiary amines in yields of 95% and more.

The tertiary amines described herein may be useful in a number of ways, depending upon their physical and chemical properties. Thus, they may serve as chemical intermediates in the preparation of quaternary ammonium compounds which are used as bactericides, germicides, emulsifying agents, textile softeners, anticorrosion agents and wetting agents. As a lubricating oil additive, the tertiary amines perform as acid scavengers and defoamers. They find use as curing agents in conjunction with other compounds for epoxy resins. Similarly they are catalysts for isocyanate foams. In rubber processing they find use as activators. More recently, tertiary amines are finding use in the extraction of metals from aqueous solutions such as produced in the uranium recovery processes. Other uses are pelletized fertilizer coatings, in cosmetic formulations and as antistripping agents.

From the above it will be apparent that modifications and variations of this improvement, as herein set forth, may be made without departing from the spirit and scope thereof. The specific embodiments described are given by way of example only and the invention or improvement is limited only by the terms of the appended claims.

We claim:

1. A liquid phase process for preparing aliphatic tertiary amine which comprises the steps of forming a mixture of alcohol and amine, said alcohol being selected from the group consisting of saturated and ethylenically unsaturated, substituted and unsubstituted, straight and branched chain aliphatic alcohols having a primary hydroxy group, said amine being selected from the group consisting of saturated and ethylenically unsaturated, substituted and unsubstituted, straight and branched chain, aliphatic amines having at least one reactive hydrogen attached to its nitrogen atom, said mixture having excess alcohol equivalent per said reactive hydrogen, said alcohol and said amine containing hydroxy and amino groups as the only reactive groups, and subsequently reacting said mixture in the presence of a catalytic amount of hydrogenation-dehydrogenation catalyst at a reaction temperature of from 90° C. to 230° C., thereby producing aliphatic tertiary amine and by-product water, and continuously removing by-product water simultaneously with the production of said aliphatic tertiary amine.

2. The process of claim 1 wherein by-product water is removed azeotropically.

3. The process of claim 1 wherein by-product water is removed under substantially atmospheric pressure by sparging the reacting mixture with gas and wherein said alcohol is saturated $C_4$–$C_{22}$ aliphatic alcohol, said alcohol having no branching in the alpha and beta positions and said amine having no branching in the alpha position.

4. The process of claim 1 wherein said amine having a reactive hydrogen is formed in situ.

5. The process of claim 1 wherein a mixture of alcohols is employed.

6. A liquid phase process for preparing tertiary amine having $C_8$–$C_{22}$ fatty carbon chains which comprises forming a mixture of fatty alcohol with amine containing at least one reactive hydrogen attached to its nitrogen atom, said fatty alcohol containing 8–22 carbon atoms in a fatty chain and having a primary hydroxy group, said mixture containing hydroxy and amino groups as the only reactive groups, reacting the mixture under substantially atmospheric pressure in the presence of a catalytic amount of hydrogenation-dehydrogenation catalyst at a reaction temperature of from 90° C. to 230° C., thereby producing said tertiary amine and by-product water, and simultaneously and continuously removing by-product water during said reacting.

7. A liquid phase process for catalytically preparing tertiary amine having alkyl groups attached to the nitrogen atom of said amine, which comprises forming a mixture of alcohol selected from the group consisting of mono-hydroxy alcohols, poly-hydroxy alcohols, and mixtures thereof, said alcohol having a primary hydroxy group, with amine having at least one reactive hydrogen atom attached to its nitrogen atom and having at least one long chain fatty alkyl group, said mixture having an excess of alcohol equivalent per said reactive hydrogen, said mixture containing hydroxy and amino groups as the only reactive groups, reacting the mixture in the presence of a catalytic amount of hydrogenation-dehydrogenation catalyst at a reaction temperature of from 90° C. to 230° C., thereby producing said tertiary amine and by-product water, and continuously removing by-product water simultaneously with the production of said tertiary amine to thereby produce a yield of tertiary amine in excess of 65%.

8. A two-stage liquid phase proces for preparing tertiary amine which comprises:
   (I) In a first stage,
       (a) treating saturated $C_4$–$C_{22}$ aliphatic alcohol with ammonia gas in the presence of hydrogenation-dehydrogenation catalyst to produce an amine batch consisting essentially of primary amine, secondary amine, tertiary amine and unreacted alcohol,
       (b) stopping said ammonia gas treatment and beginning a second stage,
   (II) In a second stage,
       (a) forming a mixture of saturated $C_4$–$C_{22}$ aliphatic alcohol having a primary hydroxy group with said amines produced in said first stage, said mixture containing hydroxy and amino groups as the only reactive groups,
       (b) reacting the mixture in the presence of hydrogenation-dehydrogenation catalyst at a reaction temperature of from 90° C. to 230° C., thereby producing tertiary amine and by-product water, and
       (c) continuously and simultaneously removing by-product water during said reacting, thereby producing tertiary amine in said second stage.

9. The process of claim 8 wherein said reacting is accomplished under substantially atmospheric pressure, wherein alcohol of stage II is added as excess alcohol in stage I, wherein all the alcohol employed in both stages is $C_8$–$C_{22}$ fatty alcohol, and wherein said catalyst comprises nickel.

10. A liquid phase process for preparing tertiary amine having alkyl chains containing 1 to 22 carbon atoms in each chain, which comprises forming a mixture of up to about 50% molar excess of alkyl alcohol having a primary hydroxy group, with amine containing at least one reactive hydrogen attached to its nitrogen atom, said mixture containing hydroxy and amino groups as the only reactive groups, reacting the mixture in the presence of a catalytic amount of hydrogenation-dehydrogenation catalyst at a reaction temperature of from 90° C. to 230° C., thereby producing said tertiary amine and by-product water, and simultaneously and continuously removing by-product water by treating the reacting mixture with a gas sparge.

11. The process of claim 10 wherein said alcohol is $C_8$–$C_{22}$ fatty alcohol, wherein said amine is selected from the group consisting of mono-amines, polyamines, and mixtures thereof, wherein said reacting is accomplished under substantially atmospheric pressure, and wherein said gas is selected from the group consisting of nitrogen, helium, methane, propane and hydrogen.

12. In a combined liquid phase catalytic and azeotropic process for producing an alkyl tertiary amine having not less than 5 carbon atoms in the two shortest alkyl chains and the total of the carbon atoms in each alkyl chain being from 1 through 22 carbon atoms, the steps comprising mixing about 5% up to about 50% by weight in excess of theoretical saturated aliphatic alcohol containing from 4 to 22 carbon atoms with an alkyl amine with not less than one hydrogen attached to nitrogen, adding a hydrogenation-dehydrogenation catalyst in a catalytic amount of about 0.1 mole to about 2 moles per mole of said alkyl amine, adding from about 5% to about 25% by weight azeotropic material capable of forming a constant boiling mixture with water for aiding in production of the tertiary alkyl amine by continuous removal of by-product water of reaction as it is formed, heating the mixture from about 90° C. to about 230° C. and effecting reaction in liquid phase at a distillation temperature for said constant boiling water mixture and for a period sufficient to simultaneously produce an alkyl tertiary amine and effect azeotropic removal of by-product water of reaction as the said tertiary amine is formed, and recovering said alkyl tertiary amine.

13. The process of claim 12 wherein, the said azeotropic material is the reactant alcohol present in an excess amount over the reactant portion thereof.

14. A combined liquid phase catalytic and azeotropic process for the preparation of an alkyl tertiary amine containing only hydrogen, carbon and nitrogen comprising mixing from about 5% to about 50% by weight in excess of theoretical saturated alcohol containing from 4 through 22 carbon atoms in an alkyl group with an alkyl amine containing not more than 22 carbon atoms in an alkyl chain and selected from the group consisting of primary alkyl amines, secondary alkyl amines and mixtures of the same, adding a hydrogenation-dehydrogenation catalyst in a catalytic amount of about 0.1 mole to about 2.0 moles per mole of alkyl amine material, adding an inert liquid azeotropic material capable of forming a constant boiling mixture with water and in an amount of about 5% to about 25% by weight of the reactant components, heating the mixture to a liquid phase reaction temperature between about 90° C. and about 230° C. and at a reflux temperature governed by said additional liquid azeotropic material, simultaneously reacting the said alkyl amine material with the said alcohol and effecting azeotropic removal of by-product water of reaction, and recovering the said prepared alkyl tertiary amine on the order of from about 65% to about 100% yield and having not less than 5 carbon atoms in the two shortest alkyl chains.

15. A combined liquid phase catalytic and azeotropic process for preparing symmetrical and unsymmetrical tertiary amines having alkyl chains containing from 1 through 22 carbon atoms with the sum of the carbon atoms in the two shortest alkyl chains being at least 5, the steps comprising mixing about 1 mole of an alkyl amine selected from the group consisting of primary alkyl amines, secondary alkyl amines and mixtures of the same with up to about 50% in excess of from 1 mole to 2 moles aliphatic alcohol containing a primary hydroxyl group and from 4 through 22 carbon atoms in an alkyl chain wherein the carbon atoms of the alkyl portion are saturated with hydrogen, adding a catalytic amount of about .1 mole to about 2 moles hydrogenation-dehydrogenation catalyst per mole of said alkyl amine adding about 5% to about 25% by weight relatively inert azeotropic material capable of forming a constant boiling mixture with water to aid in distillation thereof and the formation of said tertiary amines, heating and reacting the liquid mixture at a reflux temperature of about 90° C. to about 230° C. in combination with simultaneously effecting azeotropic removal of formed by-product water of reaction, and obtaining said alkyl tertiary amine.

16. The process of claim 15 wherein, the alkyl portions of the said alkyl amine and said aliphatic alcohol are selected from the group consisting of saturated straight chains, saturated branched chains and mixtures of said straight and branched chains.

17. A liquid process for the preparation of an alkyl tertiary amine material containing alkyl chains of from 1 through 22 carbon atoms with the sum of the carbon atoms in the two shortest alkyl chains being at least 5 and in any one chain from 1 through 22 carbon atoms, comprising mixing about a theoretical amount up to about 50% by weight in excess of theoretical of a reactant alcohol selected from the group consisting of monohydroxy and polyhydroxy alcohols with a reactant amine material selected from the group consisting of monoamino and polyamino amines and containing not less than one hydrogen atom attached to nitrogen, adding about 5% to about 25% by weight azeotropic agent capable of forming a constant boiling mixture with by-product water as a distillation aid thereof, adding a hydrogenation-dehydrogenation catalyst in a catalytic amount of about 0.1 mole to about 2 moles per mole of amine material, heating and reacting the liquid mixture at a temperature of from about 90° C. to about 230° C. and at a distillation temperature for the said constant boiling mixture in combination with simultaneously effecting azeotropic removal of formed by-product water during reaction of said liquid mixture, and obtaining said alkyl tertiary amine.

18. The process of claim 17 in which the reaction of the liquid mixture with simultaneous azeotropic removal of by-product water is conducted under sub-atmospheric pressure.

References Cited by the Examiner

UNITED STATES PATENTS

| | | | |
|---|---|---|---|
| 2,043,965 | 6/1936 | Smeykal | 260—583 |
| 2,160,058 | 5/1939 | Covert | 260—583 |
| 2,365,721 | 12/1944 | Olin et al. | 260—585 |
| 3,152,185 | 10/1964 | Zvejnieks | 260—583 |

FOREIGN PATENTS

| | | |
|---|---|---|
| 428,093 | 5/1935 | Great Britain. |
| 436,414 | 10/1935 | Great Britain. |

CHARLES B. PARKER, *Primary Examiner.*

UNITED STATES PATENT OFFICE
CERTIFICATE OF CORRECTION

Patent No. 3,223,734                                  December 14, 1965

Harlan T. Fallstad et al.

It is hereby certified that error appears in the above numbered patent requiring correction and that the said Letters Patent should read as corrected below.

Column 1, line 66, for "relative" read -- relatively --; column 2, line 18, for "$R'NH_2$" read -- $R'_2NH$ --; column 7, line 23, for "Diodecyl" read -- Didodecyl --; column 9, line 39, after "range" insert -- of --; column 13, line 1, after "liquid" insert -- phase --.

Signed and sealed this 3rd day of January 1967.

(SEAL)
Attest:

ERNEST W. SWIDER                                 EDWARD J. BRENNER
Attesting Officer                                     Commissioner of Patents